United States Patent [19]

Quevedo del Rio

[11] Patent Number: 5,071,140

[45] Date of Patent: * Dec. 10, 1991

[54] SELF-PRESSURIZED GASKET SEAL

[76] Inventor: Federico Quevedo del Rio, Joaquin Cayon No. 6, Santander, Spain

[*] Notice: The portion of the term of this patent subsequent to Jan. 3, 2006, has been disclaimed.

[21] Appl. No.: 459,547

[22] Filed: Jan. 2, 1990

[51] Int. Cl.⁵ .............................................. F16J 15/10
[52] U.S. Cl. ....................................... 277/27; 220/378; 277/71; 277/105; 277/106; 277/173; 277/207 A; 285/95; 285/348; 285/901
[58] Field of Search ...................... 277/27, 71, 60, 105, 277/106, 109–112, 115, 167.3, 167.5, 173, 182, 187, 207 A, 236; 220/3, 327, 378; 285/95, 99, 112, 338, 339, 348, 352, 900, 901

[56] References Cited

U.S. PATENT DOCUMENTS

| | | | |
|---|---|---|---|
| 50,541 | 10/1865 | Duterne | 277/105 |
| 340,801 | 4/1866 | Maule | 285/910 X |
| 795,444 | 7/1905 | Kales | 277/105 X |
| 860,035 | 7/1907 | Kerr | 277/105 |
| 1,339,636 | 5/1920 | Tulloch | 285/910 X |
| 1,389,542 | 8/1921 | Wereley | 285/910 X |
| 1,834,190 | 12/1931 | Timbs | |
| 1,988,442 | 6/1933 | Begg | |
| 2,014,480 | 8/1931 | Martin | |
| 2,282,502 | 5/1942 | Suth | |
| 3,009,721 | 11/1961 | Newton | 277/187 X |
| 3,192,942 | 7/1965 | Manor et al. | |
| 3,351,350 | 11/1967 | Shepler | |
| 3,367,682 | 2/1968 | Meriano | 277/236 X |
| 3,540,740 | 11/1970 | Smith | |
| 3,892,416 | 7/1975 | Ruhe et al. | 277/184 X |
| 4,127,310 | 11/1978 | Werner | 277/105 X |
| 4,157,835 | 6/1979 | Kahle et al. | |
| 4,299,395 | 11/1981 | Reed | |
| 4,372,565 | 2/1983 | Lien | 277/236 |
| 4,398,727 | 8/1983 | Rylander | 277/27 X |
| 4,480,841 | 11/1984 | Schukei et al. | |
| 4,500,092 | 2/1985 | Uomala et al. | |
| 4,611,813 | 9/1986 | Guerrero | |
| 4,645,214 | 2/1987 | Copley | 277/112 |
| 4,848,806 | 7/1989 | Miller | 277/27 X |

FOREIGN PATENT DOCUMENTS

| | | |
|---|---|---|
| 75464 | 2/1919 | Austria . |
| 1012786 | 7/1957 | Fed. Rep. of Germany ...... 277/106 |
| 1475892 | 2/1969 | Fed. Rep. of Germany . |
| 331013 | 6/1930 | United Kingdom . |

OTHER PUBLICATIONS

Mechanical Engineers' Handbook, Fourth Edition, pub. by McGraw-Hill Book Company, Inc., 1941, pp. 1050, 1051.
Fisher Controls Valve Schematics (1 Page) (date unknown).
"Packing and Seals", Power Magazine, Aug. 1984 (pp. S8, S9).
A. R. Freeman, "Gaskets for High-Pressure Vessels", Mechanical Engineering Magazine (1952), pp. 165–168.

Primary Examiner—William A. Cuchlinski, Jr.
Assistant Examiner—Scott W. Cummings
Attorney, Agent, or Firm—Chilton, Alix & Van Kirk

[57] ABSTRACT

A self-pressurized gasket seal arrangement comprising a first pressure part (12) having a first wall (14) surrounding a central axis (16) for confining fluid under pressure and a first shoulder (18) rigidly supported by the wall. The first shoulder defines a first support surface (20) transverse to the axis. A second pressure part (22) defines a second, substantially annular support surface (28) transverse to the axis. An annular seal ring (30) is situated for limited axial movement between the first and second support surfaces and has first and second ring surfaces (32, 34) oriented in opposite axial directions. The seal ring includes a ridge (36) for bearing on the first support surface to limit the movement of the seal ring axially away from the second pressure part and to transmit the initial preload uniformly. At least one gasket seat (40, 42) is provided on the second ring surface and annular gaskets (46, 48) are situated on each of the gasket seats. A chamber (52) maintains a portion of the ring second surface at ambient pressure while the first pressure part and the ring first surface are at the fluid pressure, whereby the fluid pressure urges the seal ring toward the second pressure part to compress the gaskets between the gasket seats and the second support surface of the second pressure part.

15 Claims, 5 Drawing Sheets

SELF-PRESSURIZED GASKET SEAL

BACKGROUND OF THE INVENTION

The present invention relates to the sealing of connections between pressure parts such as pipes, conduits and components of pressure vessels and the like.

U.S. Pat. No. 4,795,171 issued Jan. 3, 1989 for a Self-Pressurized Shaft or Closure Seal, describes a variety of arrangements for sealing the penetration of a shaft or stem in a pump or valve, and closing an opening in a pressure vessel, by advantageously utilizing the difference in pressure between the system within the pump, valve or vessel, and the ambient air pressure. The advantages resulting from use of a self-pressurized closure are fully set forth in the '171 patent, the disclosure of which is incorporated herein by reference.

SUMMARY OF THE INVENTION

It is an object of the present invention to utilize the basic concept underlying the invention described and claimed in U.S. Pat. No. 4,795,171, to the more general problem of effectuating gasket seals between pressure parts, whether or not a shaft penetrates the parts.

The invention is directed to a self-pressurized gasket seal arrangement comprising a first pressure part having a first wall surrounding a central axis for confining fluid under pressure and a first shoulder rigidly supported by the wall, the first shoulder defining a first support surface transverse to the axis. The second pressure part defines a second, substantially annular support surface transverse to the axis. An annular seal ring situated for limited axial movement between the first and second support surfaces and has first and second ring surfaces oriented in opposite axial directions. The seal ring includes a ridge or the like bearing on the first support surface to limit movement of the seal ring axially away from the second pressure part while the ring first surface is exposed to the fluid pressure within the first pressure part, and means for defining at least one gasket seat on the second ring surface. An annular gasket is situated on each of the gasket seats. Bolts or the like are provided for limiting the movement of the second support surface axially away from the first pressure part. A chamber is formed for maintaining a portion of the ring second surface at ambient pressure while the first pressure part and the ring first surface are at the fluid pressure. In this arrangement, the fluid pressure urges the seal ring toward the second pressure part to compress the gaskets between the gasket seats and the second support surface of the second pressure part.

In particular, the present invention finds advantageous use for the sealing connection between flanges or the like at the ends of pressure part such as pipes or conduits, but the invention can be more generally applied to connections between pressure parts associated with valves, pumps, and pressure vessels.

The advantages of the invention include self-pressurization and the resulting increase in sealing power of the gasket as the confined fluid pressure increases. The gasket sealing load is independent of gasket relaxation, and independent of the relaxation in the flanges and bolts. The gasket sealing load is also independent of thermal gradients and independent of any differential expansion between the bonnet and associated bolts.

In all the embodiments, the gasket loading is independent of vessel or pipe diameter. The gasket sealing load can thus be mathematically calculated and the components custom designed, to provide the optimum seal loading for a given application in the field.

BRIEF DESCRIPTION OF THE DRAWINGS

The preferred embodiments of the invention will be described below with reference to the accompanying figures, in which.

DESCRIPTION OF THE PREFERRED EMBODIMENT

Figure 1:
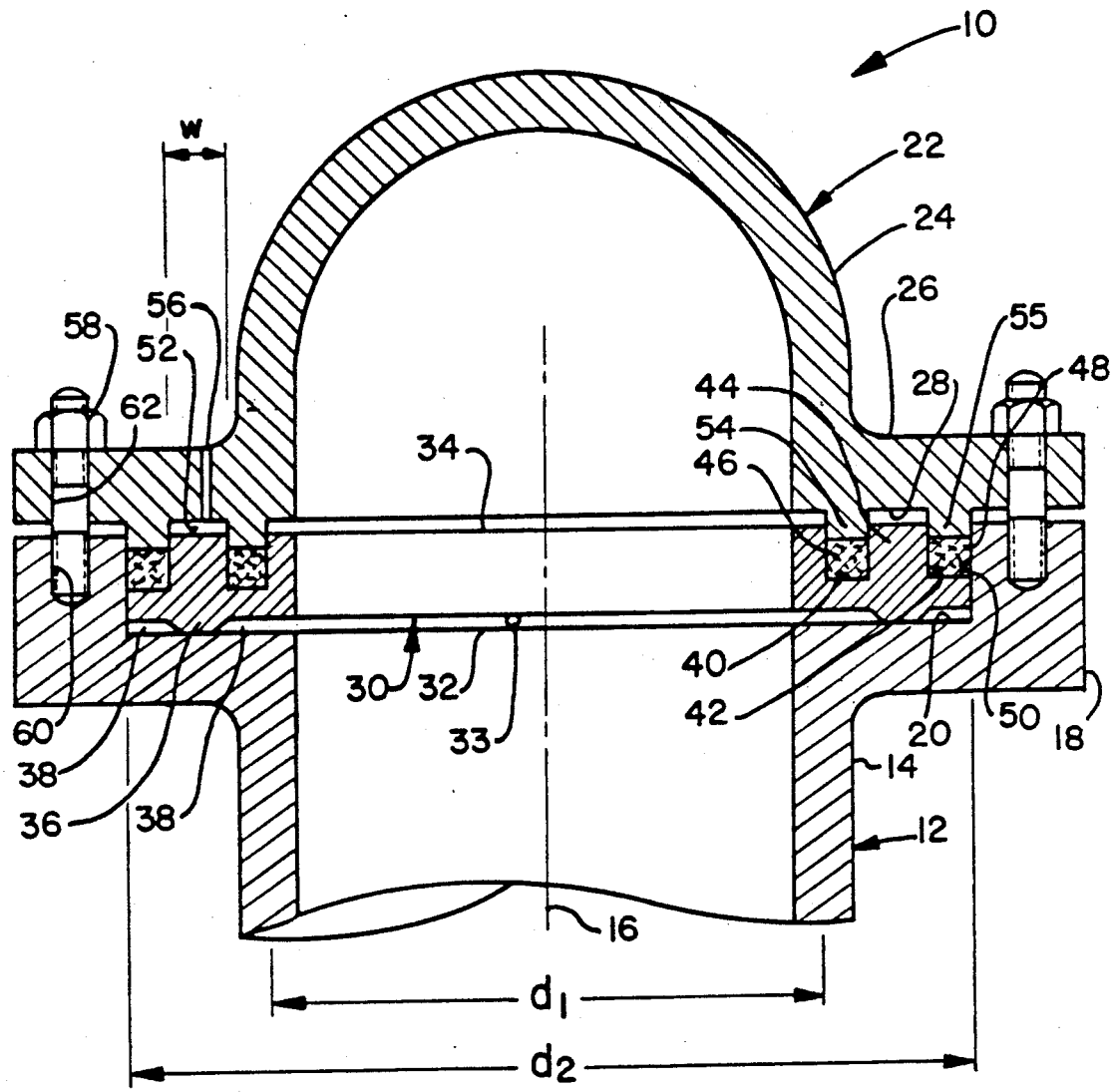
FIG. 1 is an elevation view in section, of a portion of a pressure vessel including a closure head sealed to the vessel wall in accordance with one embodiment of the invention.

FIG. 1 shows a pressure vessel 10 having a first pressure part 12 including a substantially cylindrical wall 14 surrounding a central, longitudinal axis 16, and a flange or shoulder 18 rigidly supported by the wall and extending transversely to the axis 16. The flange 18 defines a first substantially annular support surface 20 transverse to axis 16. In this embodiment, a second pressure part 22 is a closure for first pressure part 12, and includes a second wall 24 surrounding the axis 16 and a second flange 26 rigidly supported by the second wall. The second flange defines a second substantially annular support surface 28 extending transversely to axis 16.

An annular, rigid seal ring 30 is situated for limited axial movement between the first and second support surfaces 20,28. The ring 30 has first and second ring surfaces 32,34, respectively facing the first and second support surfaces 20,28. The seal ring has, preferably integrally formed thereon, a ridge 36 or other means for bearing on the first pressure part 12 to limit axial movement of the ring 30 away from the second pressure part 22. As shown in FIG. 1, the ridge 36 rests on support surface 20. While the ring is at its limited axial position, the entire ring first surface 32 is exposed to the system pressure by means of at least one radial passage 33 through ridge 36, e.g., in the region 38 between the support surface 20 and the substantially flat portion of the ring first surface 32 spaced therefrom on either side of ridge 36.

The second ring surface 34 includes at least one annular gasket seat and, in the illustrated embodiment, contains an inner seat 40 and an outer seat 42 on either side of a relatively raised, annular rim portion 44. Inner gasket 46 and outer gasket 48 lie respectively on the seats 40 and 42, and are confined between the seal ring 30, the lateral cylindrical surface 50 of flange 18, and ribs 54 and 55 which project from the second support surface 28 toward the seats 40,42.

An annular chamber 52 is established between a portion of the second support surface 28 and the seal ring rim 44, between ribs 54,55. This chamber is maintained at ambient pressure through passage 56 in the flange 26 of the second pressure part 22. The ambient pressure in chamber 52 is maintained even while the system pressure within the pressure parts increases so as to impose a high pressure at the support surface 20 of the first flange, and in any event, on the entire first surface 32 of the ring 30 as at region 38. A plurality of bolts 58 or the like are threaded through holes 60,62 in the flanges 18,26, or equivalent means are provided to limit the movement of the second flange 26 axially away from the first flange 18, as the system pressure increases.

With the arrangement described above, it should be evident that the fluid pressure of the system urges the sealing ring 30 toward the second flange 26 to compress the gaskets 46,48 between the gasket seats 40,42 and the second support surface 28 of the second flange 26.

In the embodiment illustrated in FIG. 1, the gasket load can be optimized independently of vessel diameter, in a manner not achievable with conventional self gasket sealing techniques such as the so-called original Bridgeman closure. Conventionally, the gasket load in self sealing closures is determined according to the relation:

$$s_g = p_s \times \frac{\pi}{4} d^2 / A_g \quad (1)$$

where $s_g$ is gasket load, d is the wall diameter of pressure part, $p_s$ is the system pressure, and $A_g$ is the area of the gasket.

In accordance with the invention, the gasket load is directly dependent on the system pressure multiplied by the annular area within the annulus $d_2-d_1$ on surface 32, where $d_1$ is the diameter of the seal ring at the innermost portion of inner gasket 46 and $d_2$ is the outer diameter of the seal ring first surface 32 beneath the outermost gasket 48. The load is inversely dependent on the sum of the sealing areas on gaskets 46,48. The sealing areas on gaskets 46,48 depend on w, the radial width dimension of the ambient pressure chamber 52 on the second surface of seal ring 30, as well as on $d_1$ and $d_2$. The dimensions $d_1$, $d_2$, and w are design variables by which the ideal gasket loads can be selected independent of the vessel diameter. Conventionally, the gasket load increases by the square of the diameter, but not with the present invention.

Figure 2:
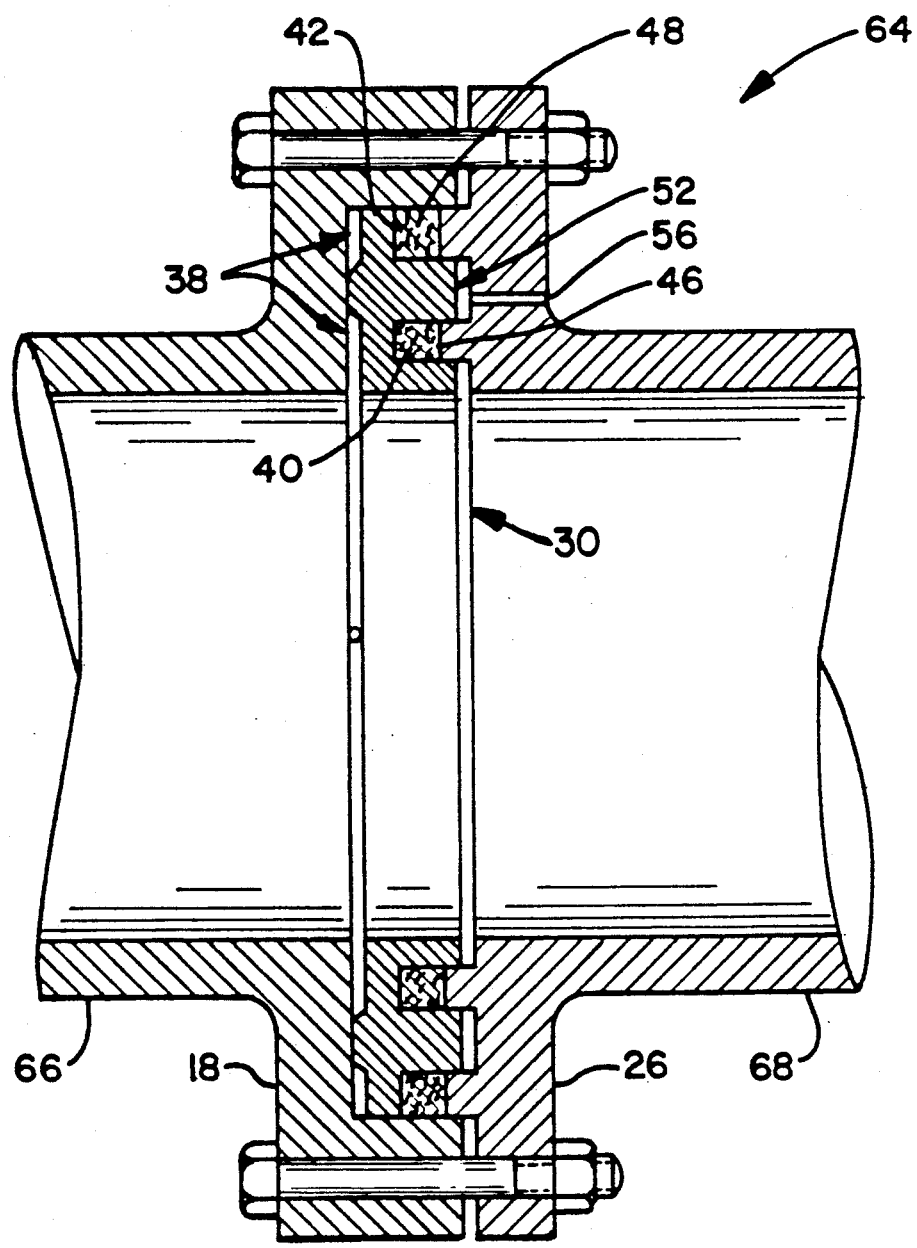
FIG. 2 is a sectioned view of a flanged connection between two conduits, utilizing the embodiment of the invention shown in FIG. 1.

FIG. 2 represents a substantially identical embodiment of the invention, implemented in the context of attaching confronting flanges in a pipeline 64 or the like. In FIG. 2, the first conduit 66 may be viewed as a first pressure part, and the second conduit 68 may be viewed as the second pressure part. As in the embodiment of FIG. 1, the first and second pressure parts 66,68 have respective flanges 18,26 with annular seal ring 30 disposed therebetween. The seal ring 30 has seats 40,42 for gaskets 46,48 and the ambient pressure chamber 52 is provided by passage 56 in the manner similar to that described with respect to FIG. 1.

Figure 3:
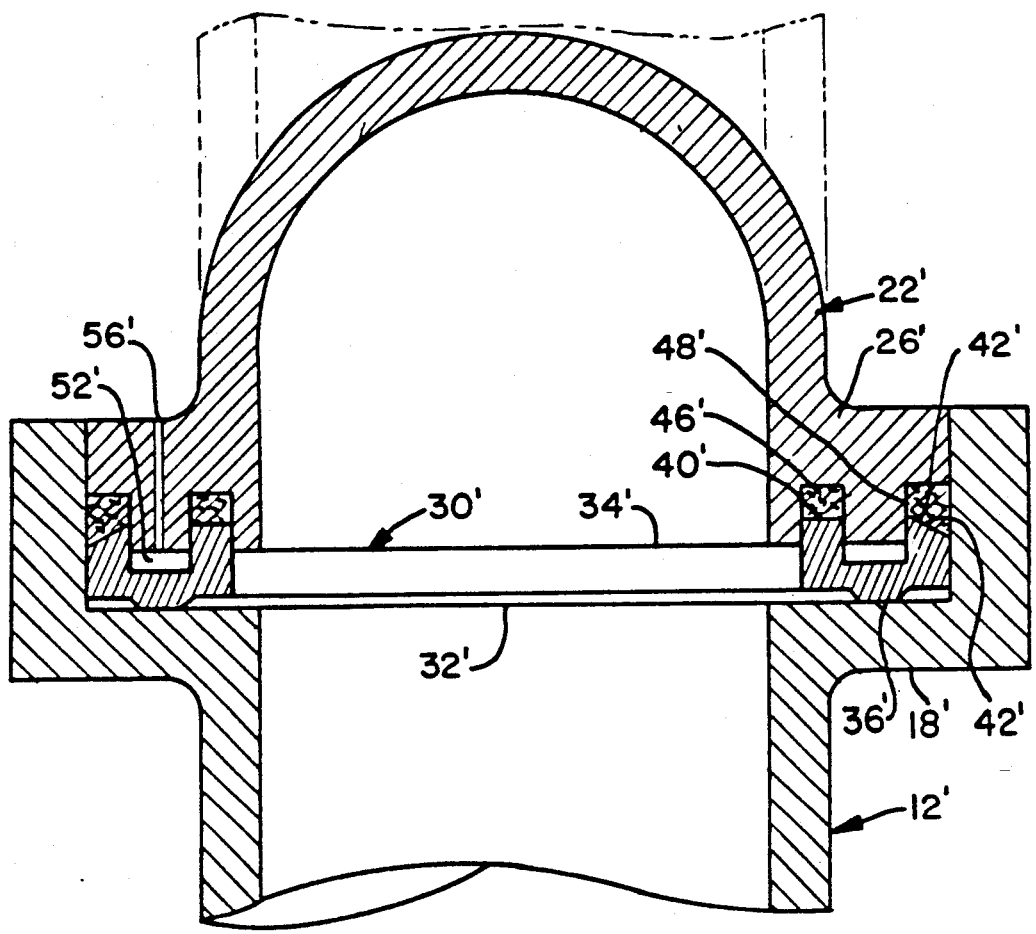
FIG. 3 is an elevation view in section, of a portion of a pressure vessel with the closure head sealed to the vessel wall in accordance with a variation of the embodiment of the invention shown in FIGS. 1 and 2.
Figure 4:
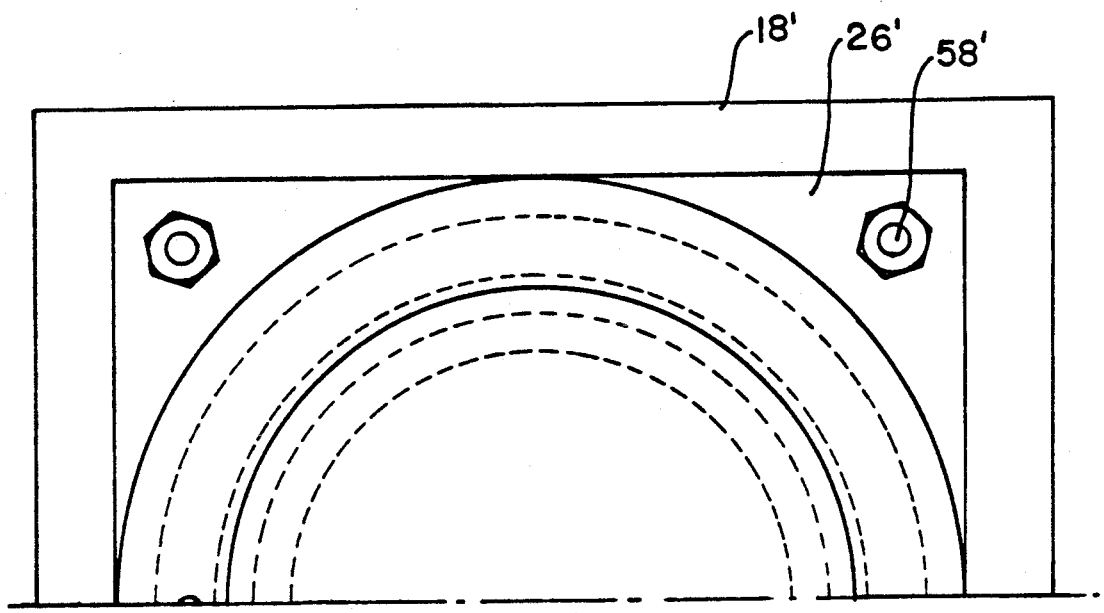
FIG. 4 is a plan view of the closed vessel shown in FIG. 3.

FIGS. 3 and 4 illustrate a variation of the invention described in FIG. 1, where the same numeric identifier has been used for the same structure, but a prime (') differentiates the component in FIG. 3 from that of FIG. 1. In FIGS. 3 and 4, the first square pressure part 12' has a first flange 18' and the second pressure part 22' has a second square flange 26', with a seal ring 30' disposed therebetween. In this embodiment, the seats 40',42' on the seal ring 30' are provided by ribs which project into respective grooves containing gaskets 46',48' in the second flange 26'. The ambient pressure chamber 52' and associated passage 56' are provided in the manner analogous to the embodiment of FIG. 1. The first ring surface 32' has ridge 36' formed therein for maintaining the spacing of the surface 32' from the flange 18'and to transmit the initial preload uniformly onto the two gaskets. As shown in FIG. 4, a plurality of bolts or similar means 58' are provided for limiting the axial movement of flange 26' relative to flange 18'. It should be appreciated. that the embodiment shown in FIGS. 3 and 4 can be implemented either for the closure of a vessel as well as the longitudinal connection between two coaxial conduits or pipes, as represented by dotted lines.

Figure 5:
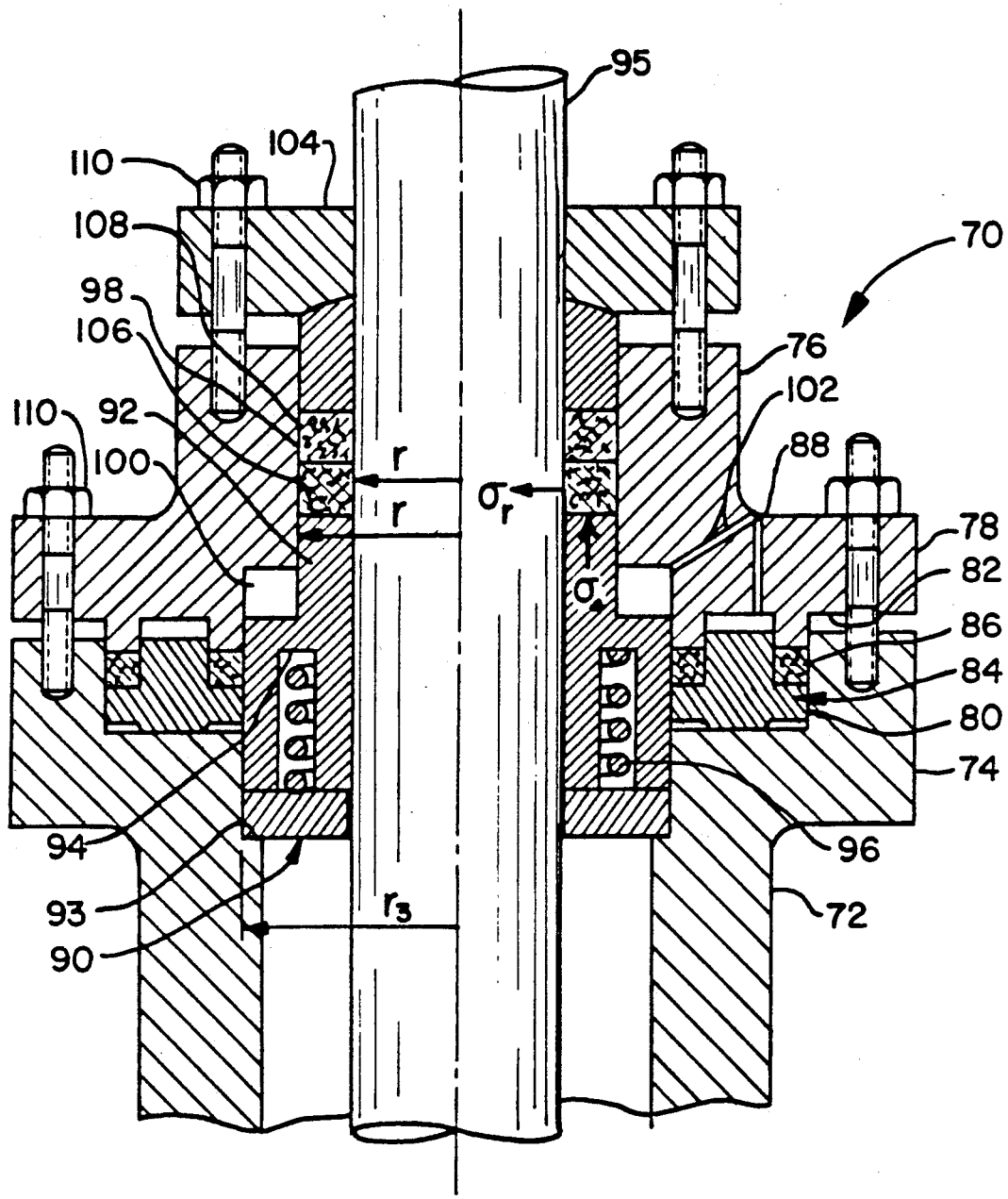
FIG. 5 is an elevation view in section, of a portion of a valve which includes the embodiment of the invention shown in FIG. 1 for sealing the bonnet to the housing, and a second embodiment of the invention for sealing the bonnet relative to the shaft.

FIG. 5 illustrates another embodiment of the invention as implemented in a valve or pump 70. In this embodiment, the first pressure part is the wall 72 defining the valve or pump housing, which has a transverse flange 74 generally opposite the flange 78 the wall portion 76 of the bonnet assembly of valve 70. The first flange 74 has a first support surface 80 and the second flange 78 has a second support surface 82 between which is disposed the seal ring 84. The sealing arrangement for the gaskets 86 in the embodiment of FIG. 5 is thus substantially identical to that described above with respect to FIG. 1, including the ambient pressure passage 88 through second flange 78.

It should also be appreciated that the first and second flanges in accordance with the invention need not be radially on the outside of the respective walls 72,76. The ring 90 in FIG. 5 is supported by an internal shoulder 93 in first wall 72, and is in that sense an internal flange adjacent to the shaft 95. Optional piston ring 92 serves the function of the seal ring and has a lower surface portion 94 spaced from flange 90 and lower surfaces 97 subject to the system pressure. The spring 96 shown in FIG. 5 is provided merely for preloading purposes and is not absolutely necessary. One or more axially stacked gaskets 98 are located on the seating surface 106 opposite surface 108 on the bonnet subassembly 104. An annular chamber 100 is provided between the portion 76 of bonnet subassembly 104 and a portion of the upper surface of ring 92. An ambient air passage 102 extends into the chamber 10. As in the previously described embodiments, the flange ring 90 limits the axial movement of seal ring 92 toward the first pressure part 72, and bolts 110 limit the movement of surface 108 on the second pressure part 104, axially away from the first pressure part.

Figure 6:
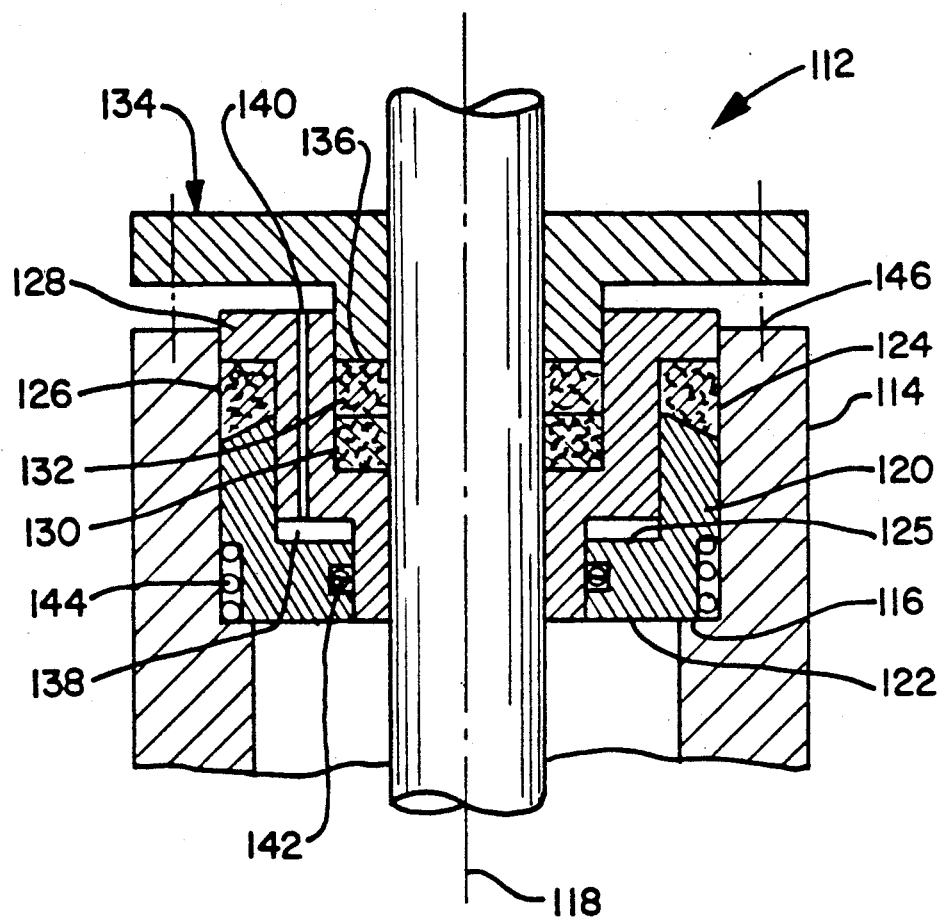
FIG. 6 is an elevation view in section, of a portion of a valve or pump showing a third embodiment of the invention, in which the bonnet subassembly is sealed to the housing by means of an internal flange on the housing wall and an intermediate ring between the seal ring and the bonnet subassembly.

In the embodiment shown in FIG. 6, a gasket seal is provided in a valve 112 or the like, between the housing wall 114 and the bonnet subassembly 134. The first pressure part wall 114 has an internal shoulder 116 which is transverse to the axis 118 and associated shaft, and spaced radially therefrom. The optional piston seal collet piston ring 120 is supported on shoulder 116 and has a first surface 122 exposed to the system pressure. The ring 120 has a second surface including a radially outward portion defining a gasket seat 124 and a radially inward portion 125 forming one wall of the ambient pressure chamber 138. An annular gasket 126 rests on the seat 124 and is bounded in part by an intermediate ring 128 which is located between the seal ring 120 and the shaft. For present purposes, intermediate ring 128 may be viewed as part of the bonnet subassembly 134. Whereas in the embodiment shown in FIG. 5, the seal ring 92 was adjacent the shaft, in the embodiment of Figure the seal ring of 120 is not adjacent the shaft. In FIG. 6, the ring 120 and associated gasket 126 are provided for the purpose of sealing between the bonnet subassembly 134 and the wall 114, and are only indirectly involved in the sealing of the shaft 118 relative to the bonnet subassembly.

As in the other described embodiments, an ambient pressure passage 140 is provided through intermediate ring 128 to the chamber 138 and, to assure the isolation of chamber 138 from system pressure, an "0" ring 142 is provided between the seal piston collet piston ring 120 and the portion of the intermediate ring 128 that is between the shaft 118 and the chamber 138. The shaft is sealed with respect to the bonnet subassembly 134 by the gaskets 132 interposed between seats 130 and 136 in the bonnet subassembly. The subassembly 134 is preloaded by spring 144 acting on sealing ring 120, through gasket 126, intermediate ring 128, and gaskets 132, against the cap portion of subassembly 134 which is rigidly secured at 146 to housing wall 114.

I claim:

1. A self-pressurized gasket seal arrangement comprising:
   a first pressure part having a first wall surrounding a central axis for confining fluid under pressure and a first shoulder rigidly supported by the wall, said first shoulder defining a first support surface transverse to the axis;
   a second pressure part defining a second, substantially annular support surface transverse to the axis;
   an annular seal ring situated for limited axial movement between the first and second support surfaces and having first and second ring surfaces oriented in opposite axial directions, the seal ring including,
   means for bearing on the first support surface to limit the movement of the seal ring axially away from the second pressure part during assembly of the seal arrangement, and
   means for defining at least one gasket seat on the ring second surface;
   an annular gasket situated on each of the gasket seats;
   means for limiting the movement of the second support surface axially away from the first pressure part while the ring first surface is exposed to the fluid pressure within the first pressure part;
   means for maintaining a portion of the ring second surface at ambient pressure while the first pressure part and said ring first surface are at the fluid pressure;
   whereby the fluid pressure urges the seal ring toward the second pressure part to compress the gaskets between the gasket seats and the second support surface of the second pressure part.

2. The sealing arrangement of claim 1 wherein the first support surface is a flat annulus, and the ring first surface is a flat annulus except for an annular ridge bearing on the first support surface, said ridge having at least one radial passage for transmitting fluid pressure to the entire ring first surface.

3. The sealing arrangement of claim 1, wherein said means for defining at least one gasket seat define radically inner and outer annular gasket seats.

4. The sealing arrangement of claim 3 wherein one of the ring second surface or the second support surface has inner and outer annular ribs which project toward and bear on the respective inner and outer gaskets.

5. The sealing arrangement of claim 4 wherein the means for maintaining ambient pressure include an annular chamber confined between said ribs, and at least one ambient air passage through one of said pressure parts to said chamber.

6. The sealing arrangement of claim 5 wherein the first support surface is a flat annulus, and the ring first surface is a flat annulus except for an annular ridge bearing on the first support surface, said ridge having at least one radial passage for transmitting fluid pressure to the entire ring first surface.

7. The sealing arrangement of claim 1 wherein the first pressure part is a vessel and the second pressure part is a vessel closure.

8. The sealing arrangement of claim 1, including means for transmitting the fluid pressure to the entire ring first support surface.

9. A self-pressurized gasket seal arrangement, comprising:
   a first pressure part having a first wall surrounding a central axis for confining fluid under pressure, a first flange rigidly supported by the wall, said first flange defining a first substantially annular support surface transverse to the axis;
   a second pressure part having a second wall surrounding the axis, a second flange rigidly supported by the second wall, said second flange defining a second substantially annular support surface transverse to the axis and opposed to the first support surface;
   an annular seal ring situated for limited axial movement between the first and second support surfaces and having first and second ring surfaces facing the first and second support surfaces, respectively, the seal ring including
   means bearing on the first pressure part for limiting movement of the seal ring axially away from the second pressure part while maintaining at least a portion of the ring first surface spaced from the first support surface, and
   means for defining inner and outer annular gasket seats on the second ring surface;
   inner and outer annular gaskets situated on the respective inner and outer gasket seats;
   means for limiting movement of the second flange axially away from the first flange;
   means for maintaining a portion of the ring second surface at ambient pressure while at least the first pressure part and the first flange support surface are at fluid pressure;
   whereby the fluid pressure urges the sealing ring toward the second flange to compress the gaskets between the gasket seats and the second support surface of the second flange.

10. The sealing arrangement of claim 9 wherein the first flange support surface is flat and the ring first surface is flat except for an annular ridge bearing on the first flange support surface, and wherein the ridge is provided with at least one radial passage for transmitting fluid pressure to the entire ring first surface.

11. The sealing arrangement of claim 9 wherein the second flange support surface has inner and outer annular ribs which project toward and bear on the respective inner and outer gaskets.

12. The sealing arrangement of claim 11 wherein the means for maintaining ambient pressure includes an annular chamber confined between said ribs and a portion of said sealing ring between the gasket seats, and at least one ambient air passage through the flange to said chamber.

13. The sealing arrangement of claim 12 wherein the seal ring second surface includes a raised rim between the gasket seats, said rim in part defining said chamber.

14. The sealing arrangement of claim 9 wherein the second flange surface includes radially inner and outer annular grooves containing the inner and outer gaskets, respectively, and the seal ring second surface include inner and outer ribs projecting into said annular grooves and defining the gasket seats.

15. The sealing arrangement of claim 9, wherein the annular seal ring includes means for maintaining the entire first surface at the fluid pressure.

* * * * *